March 14, 1933. J. L. HERZOG 1,901,598
MACHINE FOR MAKING PANEL CORE STOCK FROM MILL CLIPPINGS AND THE LIKE
Filed May 28, 1930 8 Sheets-Sheet 1

INVENTOR
JOHN L. HERZOG
BY
ATTORNEY

March 14, 1933.   J. L. HERZOG   1,901,598
MACHINE FOR MAKING PANEL CORE STOCK FROM MILL CLIPPINGS AND THE LIKE
Filed May 28, 1930   8 Sheets-Sheet 2
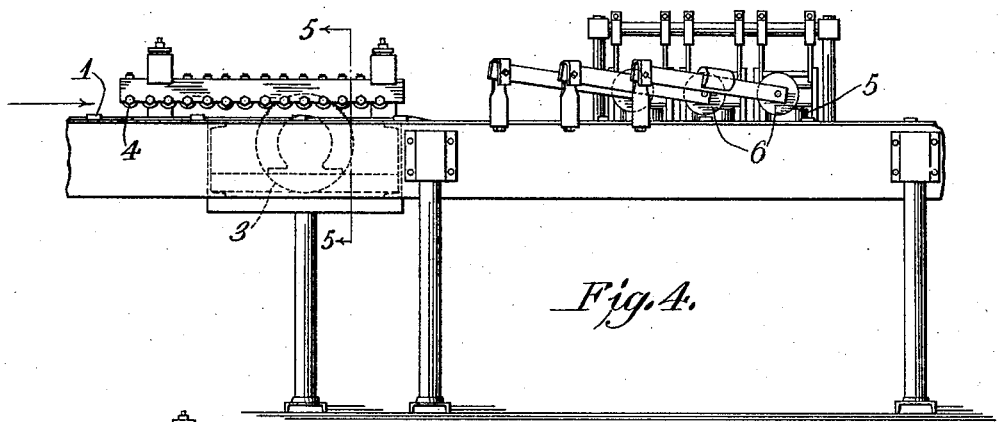
Fig. 4.
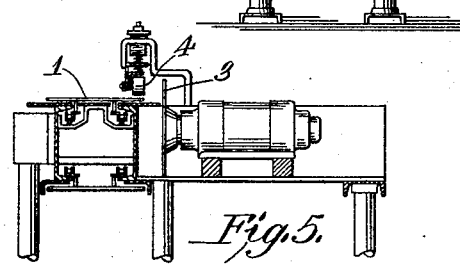
Fig. 5.
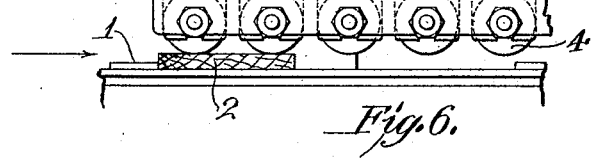
Fig. 6.
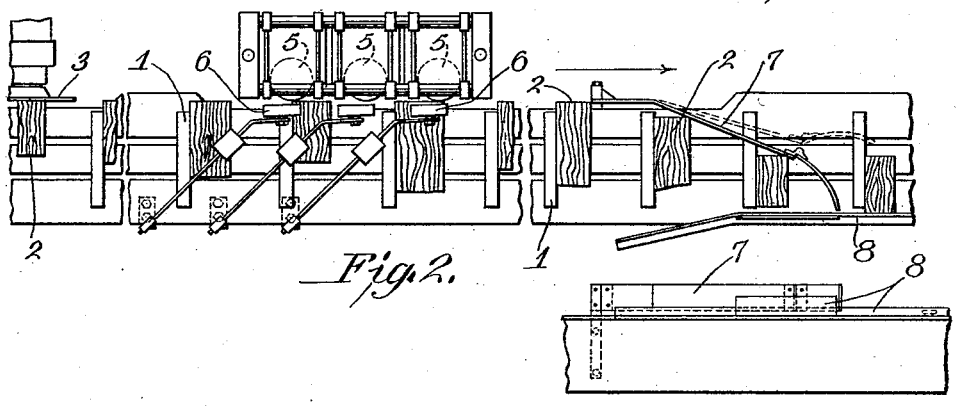
Fig. 2.
Fig. 3.
INVENTOR
JOHN L. HERZOG
BY George B. Willcox
ATTORNEY March 14, 1933. J. L. HERZOG 1,901,598
MACHINE FOR MAKING PANEL CORE STOCK FROM MILL CLIPPINGS AND THE LIKE
Filed May 28, 1930 8 Sheets-Sheet 3
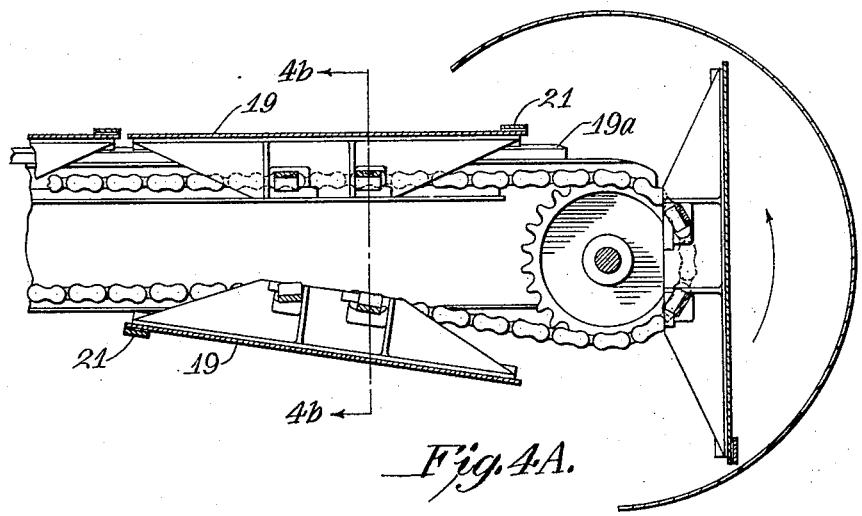
Fig.4A.
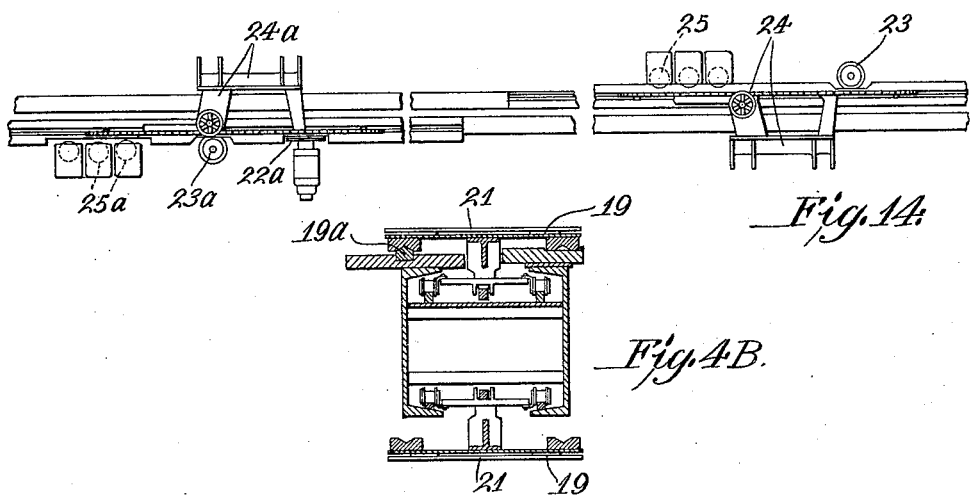
Fig.14.
Fig.4B.
INVENTOR
JOHN L. HERZOG
BY George B. Willcox
ATTORNEY March 14, 1933. J. L. HERZOG 1,901,598
MACHINE FOR MAKING PANEL CORE STOCK FROM MILL CLIPPINGS AND THE LIKE
Filed May 28, 1930 8 Sheets-Sheet 4
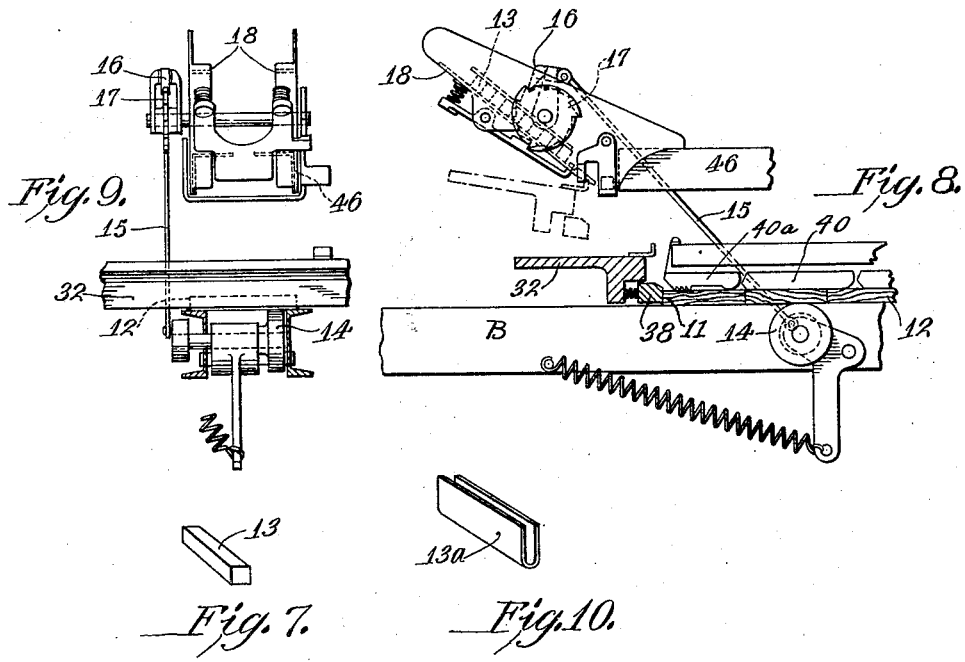
INVENTOR
JOHN L. HERZOG
BY George B. Willcox
ATTORNEY March 14, 1933. J. L. HERZOG 1,901,598
MACHINE FOR MAKING PANEL CORE STOCK FROM MILL CLIPPINGS AND THE LIKE
Filed May 28, 1930 8 Sheets-Sheet 5
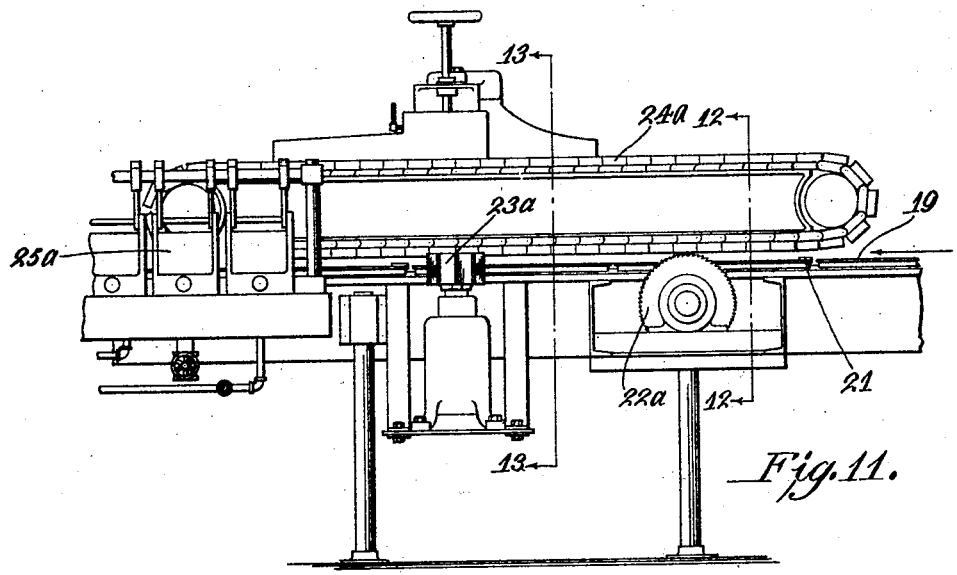
Fig.11.
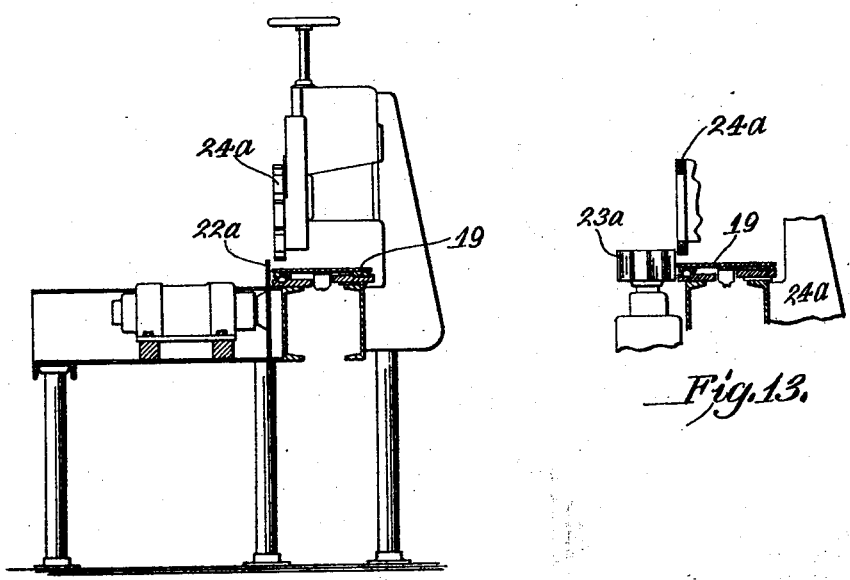
Fig.12.
Fig.13.
INVENTOR
JOHN L. HERZOG
BY George B. Willey
ATTORNEY March 14, 1933. J. L. HERZOG 1,901,598
MACHINE FOR MAKING PANEL CORE STOCK FROM MILL CLIPPINGS AND THE LIKE
Filed May 28, 1930 8 Sheets-Sheet 6

INVENTOR
JOHN L. HERZOG
BY
ATTORNEY

March 14, 1933. J. L. HERZOG 1,901,598
MACHINE FOR MAKING PANEL CORE STOCK FROM MILL CLIPPINGS AND THE LIKE
Filed May 28, 1930 8 Sheets-Sheet 7
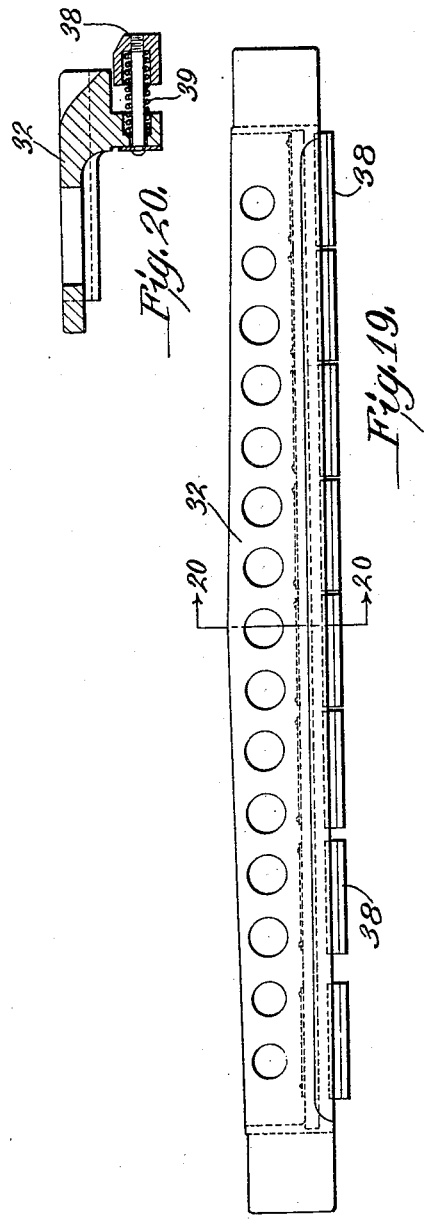
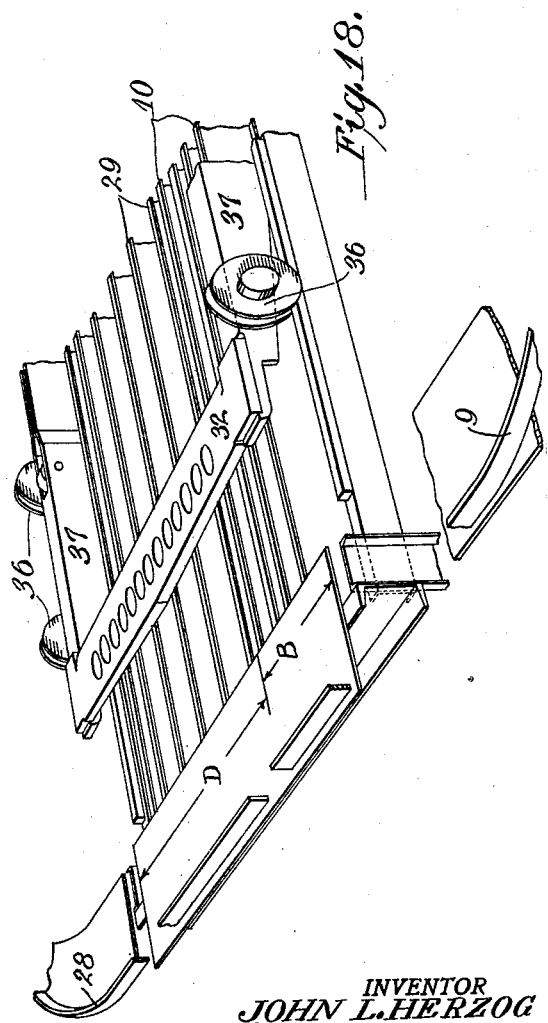
INVENTOR
JOHN L. HERZOG
BY
ATTORNEY March 14, 1933. J. L. HERZOG 1,901,598
MACHINE FOR MAKING PANEL CORE STOCK FROM MILL CLIPPINGS AND THE LIKE
Filed May 28, 1930 8 Sheets-Sheet 8

INVENTOR
JOHN L. HERZOG
BY
ATTORNEY

Patented Mar. 14, 1933

1,901,598

UNITED STATES PATENT OFFICE

JOHN L. HERZOG, OF SAGINAW, MICHIGAN, ASSIGNOR TO JOHN L. HERZOG CO., OF SAGINAW, MICHIGAN, A CORPORATION OF MICHIGAN

MACHINE FOR MAKING PANEL CORE STOCK FROM MILL CLIPPINGS AND THE LIKE

Application filed May 28, 1930. Serial No. 456,484.

This invention relates to machines for making core stock for panels, such as are employed for interior finish of buildings, in the manufacture of furniture, phonograph cabinets, radio cabinets and the like. The panels are made of one or more layers of veneer glued to the surfaces of a core, which is a board, about three-eighths inch thick and of suitable width, say, three feet, and about five feet long.

Heretofore, panel core stock has usually been made by sawing thin boards from planks of chestnut or other light timber, and gluing the thin boards together edge to edge in a glue press, after which the core stock piece so made was surfaced and trimmed. The cost of suitable plank from which to saw the boards is increasing and there is considerable waste of the material in the form of trimmings and end clippings that had to be disposed of by conveying them from the cutting machine to the boiler furnaces.

An object of my present invention is to provide a machine to which such clippings can be delivered, and the semi-automatic action of the machine converts them into core stock of the required dimensions, say, three feet by five, ready for surfacing to the required thickness.

Other objects are to so arrange and organize the machine that only a small amount of manual work is required in its operation, so that its speed of production, and the small amount of power needed enable it to fabricate core stock of superior quality from otherwise waste clippings at about one tenth of the usual cost per square foot of similar stock made from chestnut planks.

A further object is to provide a machine of high capacity that can cheaply produce core stock from relatively wide pieces of board, as disclosed in my method Patent No. 1,638,262, issued August 9, 1927, and, furthermore, can also utilize very small and narrow mill clippings as well.

Another object is to organize the glue-pressing mechanism of the machine so that each glued joint will be pressed while the work is moving from the receiving end of the machine, where the glued pieces are inserted, toward the delivery end from whence the panel stock, with its joints permanently united, is removed. Thus the glue-pressing operation is continuous as distinguished from the batch method employed in many types of glue pressing machines.

An object of the invention is to provide a machine that will accommodate clippings that are of widely different sizes and thicknesses, converting them during their passage through the machine into core stock of any desired width within the capacity of the given size machine, and of indefinite length, say, up to forty feet or more, keeping the panel stock flat, true, and delivering it so tightly glued that the completed panel will break through the wood rather than at a glued joint.

The foregoing objects and certain others that will appear later in the specification are attained by the following instrumentalities wherein reside the principle of operation and the claimed novelty of the invention.

Although the machine as a whole performs its work by converting clippings into panel core stock in one continuous operation, I shall, for purposes of clearer description, describe it as made up of four principal departments, according to the successive stages of operation performed on the material.

In the accompanying drawings Fig. 1 is a schematic diagram showing in plan view the four departments of the machine, A, B, C, D.

Fig. 2 is a fragmentary top plan view of the first department of the machine, viz., the clipping trimmer and end gluer.

Fig. 3 is a side view of the transverse guide bar shown in Fig. 2.

Fig. 4 is a side view of trimmer saw 3 and glue spreader 5 with their associated parts.

Fig. 4A is a longitudinal section at one end of the plate conveyor 19 which carries material past saws 22, 22a.

Fig. 4B is a section taken on line 4b—4b of Fig. 4A.

Fig. 5 is a section on line 5—5 of Fig. 4.

Fig. 6 is an enlarged side view showing part of the presser roll frame shown in Fig. 4.

Fig. 7 is a perspective view of a spacer bar.

Fig. 8 is a part sectional side view of a machine for feeding the spacer bars.

Fig. 9 is a part sectional end view of the mechanism shown in Fig. 8.

Fig. 10 is a view similar to Fig. 7, showing a type of modified spacer for ribbon press B, made of folded paper.

Fig. 11 is a side view of the edge trimmer and glue spreader for department C.

Fig. 12 is a transverse sectional view on line 12—12 of Fig. 11.

Fig. 13 is a fragmentary sectional view on line 13—13 of Fig. 11.

Fig. 14 is a diagrammatic plan view of the cutter, trimmer and glue spreader arrangement herein referred to as department C of the machine.

Fig. 18 is a perspective view, partly broken away, showing the feed bar for the panel presses.

Fig. 19 is a plan view of the feed bar.

Fig. 20 is a section on line 20—20 of Fig. 19.

Figure 1:
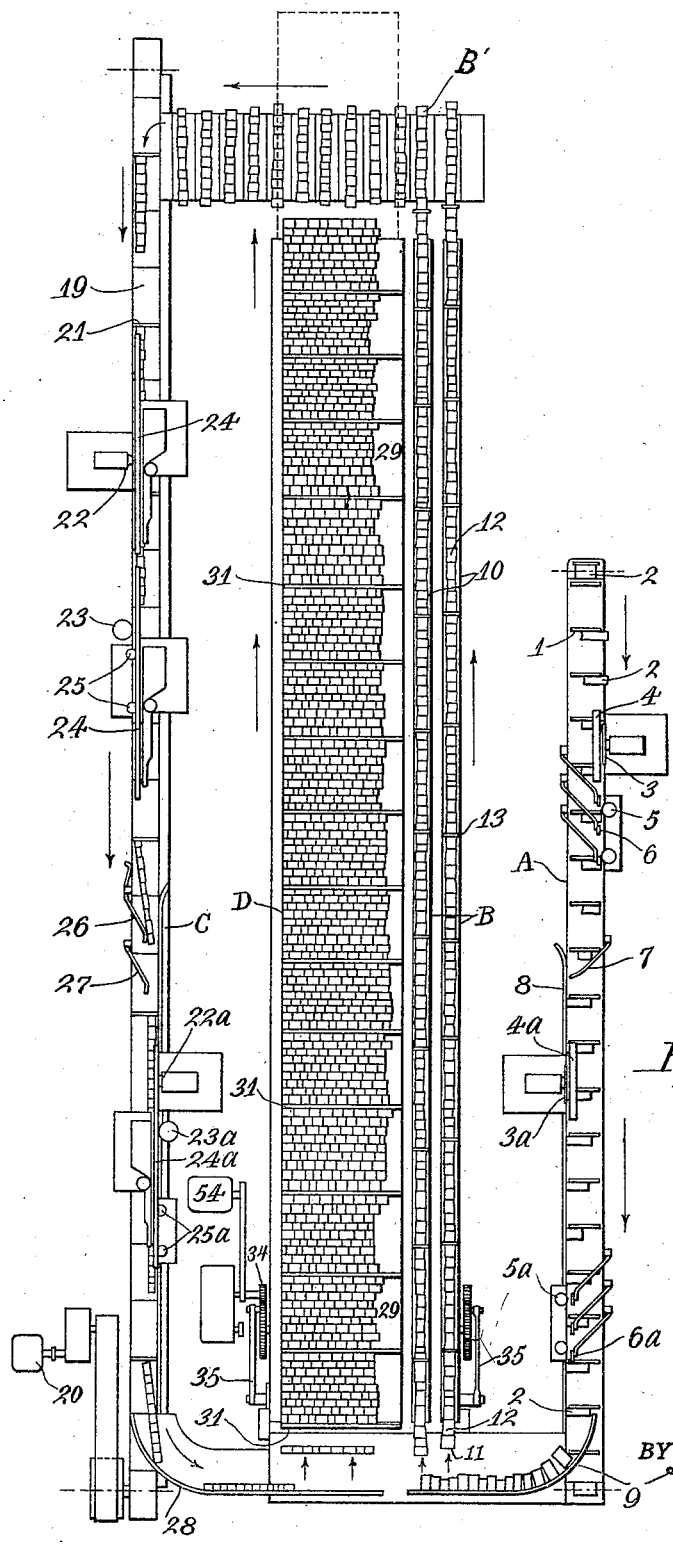

Mill clippings, that is, the waste short lengths that are cut from boards in the usual operation of a furniture or other wood working plant, are supplied to the machine. The first stage of their fabrication into panel core stock occurs while they are being forwarded in regular sequence along a longitudinal conveyor that constitutes the first department of the machine, A. The two ends of each piece are saw-trimmed, in a direction across the grain of the wood, and parallel. The freshly trimmed ends of each piece are also glue coated. I term this department A of the machine the "work-piece trimmer and end gluer".

The trimmed and glue-coated pieces are then fed to the second department of the machine, wherein they are placed end to end one after the other and pushed along a guideway, the pieces forming a long board or ribbon. Preferably two or more such guideways are provided, one for the narrowest pieces and the other for wider pieces, the purpose being to make each ribbon of uniform width, as nearly as may be, and thus reduce the amount of material to be cut off by edge trimming.

The end-glued pieces received from the first stage may be sorted as to width and fed into the appropriate guideways by hand, or a sorting and feeding mechanism may be employed. For purposes of this description, hand labor is assumed to be employed at this point.

The long ribbon of clippings is pushed forward progressively as new pieces are added, the pusher being power driven. The pressure of spring-pressed shoes is applied at intervals along the length of the guideway to hold the clippings down upon the bed of the guideway, and to furnish, by the resultant frictional resistance, the heavy unit pressure that is required to be applied against the glued joints to unite them.

The length of the guideway and the rate of feed determines the length of time the glued joints shall remain on the guideway. Consequently the guideway is made long enough to carry the ribbon until the glued joints arriving at the delivery end have set sufficiently for safe handling of the assembled ribbon.

Division of the ribbon into lengths of, say, five feet, is accomplished without interfering with the glueing and pressing operation, by periodically inserting spacers, such as paper strips or small metal bars to prevent union of the glued clippings at such places. The spacers drop away when the five-foot glued boards emerge from the guideway. I term this second department B of the machine the "ribbon press". The boards are delivered to a conveyor and transported to the next station.

The third department of the machine is for edge trimming and glue coating the edges of the glued-up boards just mentioned. At this stage, if any other boards of about the same length, say, five feet, are available they may, along with the glued-up boards, be fed to travel in the direction of the length of and along a conveyor equipped with edge-trimming cutters or saws, and with glue spreaders for coating the two longitudinal edges of each board in succession. At the end of this conveyor they are discharged one after the other and delivered, either by hand or by suitable feeding mechanism of known construction, to the panel-forming press. I term this department C the "board-edge trimmer and gluer".

The fourth department of the machine is a long stationary guideway or bed, at least as wide as the boards are long, say, five feet, with spring-pressed shoes arranged to hold the boards down upon the bed and, by the subsequent frictional resistance, to furnish the unit pressure required to satisfactorily establish the glued joints. The presser shoes are, preferably, like those already referred to in the description of the second or ribbon-forming department of the machine. Here also, spacer bars or equivalent means are employed to separate the long band of material on the bed into panel pieces of suitable width, say, three feet, by preventing the adhesion of the seams at such intervals.

The length of the panel glue-press bed is sufficient to insure proper setting of all the longitudinal seams before the built-up stock is delivered from the bed. This fourth department D of the machine I term the "panel press".

The stock as delivered from the panel-forming bed is in the form of panels about three feet wide and five feet long, approximately flat on the face that is in contact with the bed, its top face uneven, if the work-pieces or the boards of which it is made are of various thicknesses. One end of the panel is approximately straight, having been aligned by a guide rail on the panel bed, and the other end is irregular. The two longitudinal side edges are trimmed and parallel. Hence the product of the machine as herein described is a piece of panel core-stock that will be ready for use when trimmed to the desired size and contour, and surfaced on both sides to bring it to the desired thickness, say, three-eighths inches.

The construction and mode of operation of the essential parts constituting each principal department A, B, C, D of the machine will now be described, as they are found in the embodiment of the invention which I have chosen for purposes of description. It is to be understood that other embodiments than those shown may be employed without departing from the scope of my invention as set forth in certain of the claims.

Referring to Figs. 2–6, 1, 1 are conveyor flights that are continuously moved in the direction of the arrow, each transporting a piece of wood or clipping 2 in known manner. A cut-off saw 3 trims an end of each piece, the latter being held down by presser rollers 4, and glue spreaders 5 apply a thin coating of liquid glue to the freshly severed end while the piece is being held down by weighted rollers 6. The forwardly moving piece then encounters a spring guide bar 7, Figs. 2 and 3, positioned diagonally across its path of travel and is thereby slid endwise along the guiding edge of flight 1 until its other end encounters a stationary guide rail 8 at the side of the conveyor, which directs it in properly aligned position past another similar cut-off saw 3a, Fig. 1, where that end is severed parallel with the opposite end.

While being sawn the piece is held down by spring-pressed rollers 4a similar to rollers 4.

If desired, this newly severed end likewise may be coated with glue by spreaders 5a while being held down by rollers 6a.

A curved guide rail 9, projecting across the path of forward travel of piece 2 slides it sidewise off the conveyor and turns it into position for entrance into the guideway of ribbon press B, its freshly glued edges positioned transversely of the guideway, as shown in Fig. 1.

The second department B of the machine, called the ribbon press, consists of one or more long straight guideways or troughs 10, some of them narrow and others wider, to accommodate the widths of the clippings received from the work-piece trimmer and end gluer A, and sorted as to size by an operator stationed at the intake end of B. The troughs are flat bottomed, and as each piece is put into position by the operator it is fed by an appropriate power-operated pusher of known construction, against the end 11 of the ribbon 12 of material in the trough, and the new piece pushes the ribbon ahead of it. Because of the normal frictional resistance of the long ribbon 12 against the bed of the trough, the force of the pusher against each newly added piece compresses the freshly glued joints, and this pressure at the joints is increased by the application of yielding pressure to the top face of the ribbon at spaced intervals along its length. The construction and arrangement of the pressing pads or shoes are substantially the same as those used in the panel press D, and will be described in detail in that connection.

To conveniently divide the ribbons 12 into suitable lengths corresponding approximately to the desired width of the finished panel section, say, three feet, spacers 13 are inserted at certain of the glued joints to prevent them from adhering.

The spacers may be short bars of metal or other material having a surface that will not adhere to the glued ends of the adjacent clippings. In Fig. 7 a spacer made of a bar of metal is shown, and in Fig. 8 is shown a part-sectional side view of a machine for feeding such bars crosswise of the guideways 10 at appropriate intervals.

A measuring wheel 14, Figs. 8 and 9, is yieldingly pressed against the under face of the advancing ribbon 12, and through suitable connecting rod and pawl and ratchet connection 15, 16, 17, intermittently releases the spacer bars 13 in succession from a chute or hopper 18 each time a length, say, five feet, of material has been fed into the machine, and drops them upon the table B, whereupon each spacer 13 comes between two work-pieces and becomes a separable part of the ribbon 12, as is indicated in Fig. 1.

As has been previously stated the relationship of the length of the ribbon press B, the number of presser pads or shoes acting on ribbon 12 and the amount of pressure exerted by each, are such that the glued joints will have thoroughly set when the spacer-separated, built-up boards have reached the end of table B. Here the boards can be handled without danger of breaking. They pass to conveyor B' which delivers them to the edge trimmer and gluer C, as shown in Fig. 1.

A plate conveyor 19 is driven in the usual way from a source of power 20. Its plates, shown in Fig. 4A, have transverse abutment cleats 21. The plates carry the newly made boards past the cutters by which they are edge trimmed. The cutters, positioned as in Figs. 1 and 14, preferably consist of saws 22, 22a similar to the saws 3, 3a of the workpiece conveyor A, each saw being followed by a shaper head 23, 23a, there being a saw and shaper head and a traveling chain holddown 24 at the right side of the conveyor at the beginning of the board's forward travel, and another similar assembly 24a, shown in Figs. 11, 12, 13, 14, to trim the left hand edge of the board as it approaches the end of its travel. Glue spreaders 25 and/or 25a coat one or both of the newly planed edges of each board, and guide arms 26, 27, Fig. 1, shift the board from one side of the conveyor to the other, in the manner already described in respect to conveyor A. Sidewise movement of the conveyor is prevented and the conveyor itself is kept in alinement by guides 19a, as shown in Fig. 4B. After both edges of the boards have been trimmed and coated with glue the conveyor delivers them against a deflecting guide 28 which directs them into position to be fed into the panel press D, with their glued edges positioned transversely to their direction of travel through the press.

Panel press D consists of the large flat table or bed 29 along which the boards are pushed in the form of a long band. The propelling means is a mechanically actuated pusher, preferably of the reciprocatory feeding type that adds one board at a time and by pushing against it moves the entire ribbon forward a distance equal to the width of the board being added. Spacers 13 or 13a are added at suitable intervals in the manner already described in reference to the ribbon press B, in order to deliver the panel in units that are convenient for handling.

The feeding-in mechanism for the panel press D as embodied in a preferred form will now be described and it will be understood that the same general type of mechanism is employed as is used for feeding clippings to the guideways of the ribbon press B, in fact, if D and B are placed side by side the same pusher bar may serve them both, as will be described.

Figures 15, 16, 17:
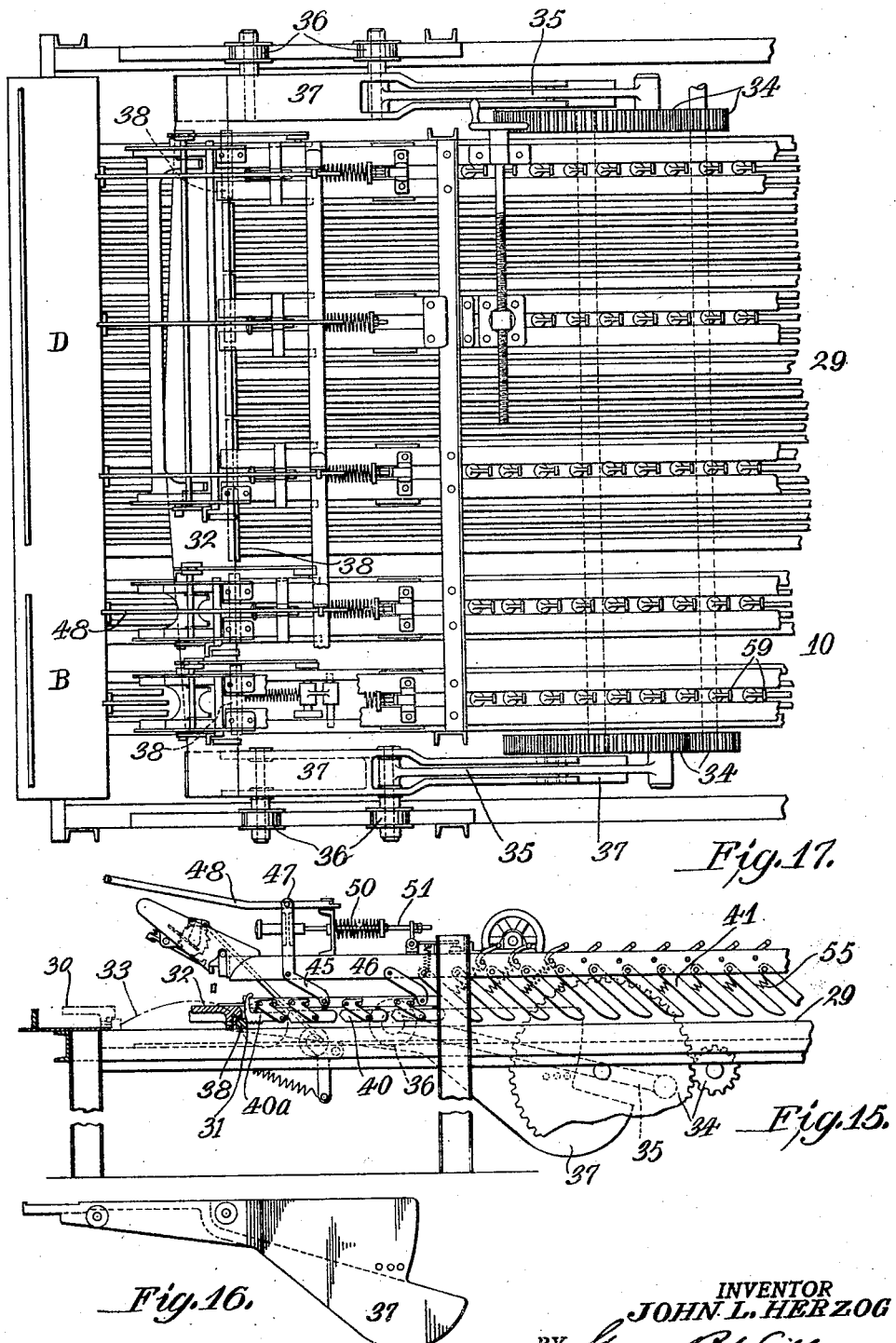
Fig. 15 is a fragmentary side view, partly sectional, of the feeding-in device for the ribbon and panel presses.
Fig. 16 is a detail of the counterweight shown in Fig. 15.
Fig. 17 is a plan view of the part of the machine shown in Fig. 15.

Referring to Figs. 15 and 17, pusher bar 32 extending across the width of the panel press D and ribbon press B is made to reciprocate with a forward and backward movement, the back position being indicated by dotted lines at 30 in Fig. 15. The forward stroke of the pusher is along the surface of the bed 29 to 31, but on the back stroke the pusher bar is lifted and traverses a path indicated by the curved line 33.

The operating mechanism by which this movement is imparted to the pusher bar may be of known type, including power driven gears 34 actuating pitmans 35 which are hinged at their forward ends to a wheeled carriage 36. This carriage is counterbalanced by suitable weights 37 so the pusher bar 32 can be lifted for its return stroke without appreciable effort. The lifting is directed automatically by guiding devices of known construction, not shown.

Fig. 18 illustrates, in perspective, the general arrangement of the pusher bar 32, bed 29 and the curved guides 9 and 28 that direct the material to the ribbon press B and to the panel press D, both of which preferably are served by the same pusher bar 32, and are identical in their manner of functioning.

The working edge of the bar 32 is provided with a working rail 38 yieldingly backed by springs 39, as shown in detail in Fig. 20.

The boards, with one or both of their side edges glue-coated arrive at panel press D from the edge trimmer and gluer C in the manner already described, or they may be supplied from other mill stock at this stage of operation.

Working rail 38 of the pusher bar 32 moves each piece forward in succession, the piece being deposited in front of the rail travels preferably by the operator, but by suitable feed mechanism of known construction, if desired. As boards are added one after the other the band so formed extends itself by pushing forward along the stationary bed 29. The freshly glued boards are held in place against each other by spring pressed pads 40 or their equivalents, Figs. 21 and 22, during the first few feet of their travel, and subsequently by spring pressed shoes 41. The first pad 40a, of the series 40 may have its bottom face toothed as shown, to prevent the latest inserted piece of wood from springing back when the pushing force of bar 32 is released, due to the resilience of the compressed wood comprising the long panels of the panel press D.

Figures 22, 23:
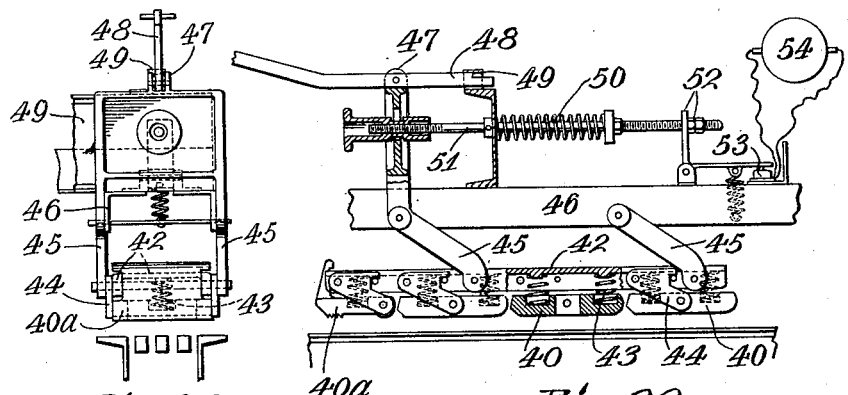
Fig. 22 is a side view, partly in section, of the pad-adjusting mechanism.
Fig. 23 is an end view of the parts shown in Fig. 22.
Figures 24, 25:
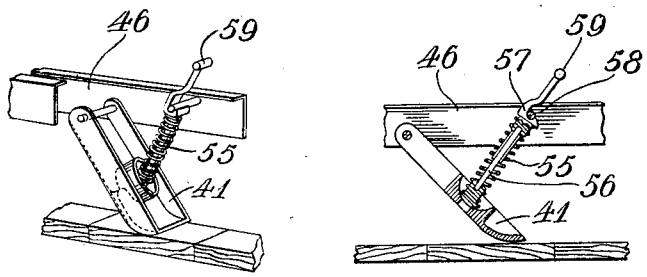
Fig. 24 is a perspective detail of a spring-pressed shoe.
Fig. 25 is a part sectional detail of a spring-pressed shoe.

Referring to Fig. 22, the pads 40a and 40 are all mounted on a frame 42 and each pad is pressed downward by springs 43 and is pivoted to the frame 42 by links 44. The frame itself is suspended by parallel links 45 from a stationary part 46 of the frame of the machine, the foremost links having an upwardly projecting lever 47, which upon being moved forward or backward will lower or raise the frame 42 and pads 40 and 40a. The lever 47 can be locked in its forward position by means of a latch bar 48 pivoted to it, a notched end of the bar engaging in a stationary part 49 of the machine frame. When the latch bar 48 is released a compressed spring 50 actuates a rod 51 to throw the lever 47 forward, or to the right in Fig. 22, and thus cause the frame 42 to yieldingly press the pads down upon the work.

When lever 47 raises the pad frame 42, stop members 52 on rod 51 actuate a push button 53 to stop the motor 54 by which the pusher bar 32 is actuated, so that the presses B, B can not be operated unless the pads 40 and 40a are down upon the work.

The spring pressed shoes 41 are pivoted at their upper ends to the stationary frame 46, their lower ends being rounded to permit the advancing work to be slid under them.

An adjustable spring 55 is mounted on a telescoping rod 56, which has at its upper end a socket 57 to receive a pin 58 on the stationary frame 46. The upper end of rod 56 also has a handle 59 by which it can be engaged or disengaged from the pin 58 in order to bring the individual presser shoes 41 into or out of action and thus control the total amount of frictional resistance to the forward movement of the material. The amount of frictional resistance also fixes the intensity of pressure on the glued joints when they enter the press. The springs of shoes 41 will automatically increase their pressure if pieces of wood of, say, twice the normal thickness, pass under them, consequently doubling the friction and automatically doubling the total pressure on the glued joint, thereby keeping the intensity of pressure at all of the joints uniform regardless of variations in thickness of the work.

To facilitate rapid setting of the glue the edges of the material-pieces are preferably heated by first placing them on steam-heated iron plates. Thus the wood is warmed and the penetrating power of the warm glue is increased, materially reducing the time required for setting.

Figure 21:
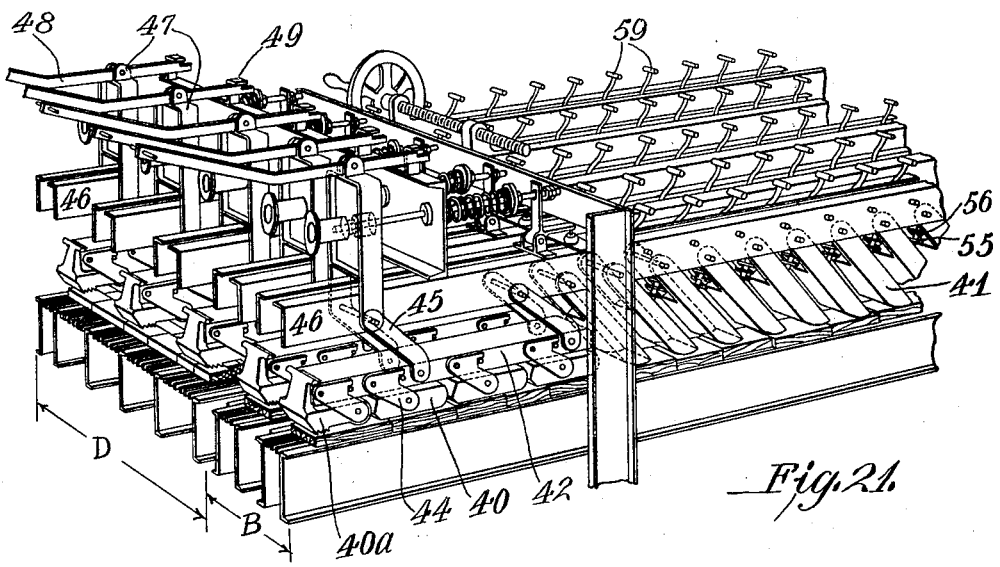
Fig. 21 is a perspective view of the presser pads at the intake end of the presses.

The rows of presser pads 40 and shoes 41, as shown in Fig. 21, can each be regulated with respect to pressure and frictional resistance according to the size, thickness and character of the pieces being handled, by putting a greater or less number of pads or shoes into operation.

The presser shoes 41 can be distributed in any desired manner along each row, either close together or far apart, as needed.

When the material finally emerges from the press its glued joints are thoroughly set and the boards of panel stock are ready to be surfaced and cut to size or pattern. The surfacing may be performed in a wide planer in the usual manner.

By the means above described I have produced a machine that is capable of converting mill clippings and small board stock into first class panel stock with a comparatively small expenditure of power and manual labor and at a production rate many times greater than that of the batch process usually employed.

Having thus described my invention, what I claim and desire to secure by Letters Patent is:

1. A horizontal conveyor having transverse flights for forwarding pieces of wood lengthwise the conveyor, a trimming saw and a hold-down arranged at one side of the conveyor, said saw adapted to trim the ends of pieces thereon, a glue spreader positioned for coating the trimmed ends, a guide bar positioned in the path of travel of the pieces and extending transversely above the conveyor, for shifting the advancing pieces to the opposite side of the conveyor, and a guide, a trimming saw, a hold-down and a glue spreader operatively arranged at the opposite side of said conveyor toward its delivery end, means for deflecting end-glued pieces of work away from the conveyor flight and for positioning them with all of their glued ends extending in the same direction, a ribbon press including a guideway, a mechanically operated pusher, means yieldingly pressing the material against the guideway at spaced intervals along the length of the guideway sufficient to produce adequate intensity of gluing pressure at the joints of the work during the forward movement of the pusher, the length of the guideway being sufficient to accommodate the travel of the glued joints until they have set sufficiently to be safely handled, means for dividing the glued ribbon emerging from the guideway into appropriate board lengths, a second conveyor having operatively associated therewith two saws, two shaper-heads, and two glue spreaders, one of each operatively arranged at each side of the conveyor, holding-down means for the work adjacent said saws and shaper heads, means for shifting the work from one side of the conveyor to the other during its forward progress, guiding devices engaged by the edge-glued boards and arranged to deflect them into position for feeding to a panel press, said panel press including a power-actuated pusher bar, a longitudinally extending bed, work-pressing pads above said bed near the pusher bar, a plurality of individual spring-pressed members distributed along the length of the bed and adapted to yieldingly press upon the work during its passage along the bed, the pressure of said pads and said spring-pressed members being adapted to maintain appropriate intensity of gluing pressure at the glued joints while they are being subjected to the forward pressure of the pusher bar.

2. A traveling conveyor having transverse flights, two trimming saws, one at each side of the conveyor and spaced lengthwise thereof, a work-piece guide located above the flights and extending diagonally across the conveyor after the first saw, a glue spreader at the side of the conveyor after one of said saws, a plurality of long tables of various widths appropriate to the pieces being worked, said tables arranged side by side, a push-feed mechanism in common to all of said tables, yieldingly mounted presser shoes opposed to each table and spaced transversely and lengthwise thereof, the presser shoes at the entrance to the tables having work-gripping teeth, pressure adjusting means for each shoe, guide means at the end of said traveling conveyor arranged to engage said work-pieces on the conveyor and dispose them for forwarding along one of said tables with their glued edges contiguous, a transfer conveyor at the delivery end of said table, a second traveling conveyor having transverse flights and located to receive material strips from said transfer conveyor, two edge-trimming cutters located one at each side of the conveyor and spaced lengthwise thereof, work-shifting guides disposed diagonally across the conveyor after the first trimming cutter, a glue spreader located after one of said trimming cutters, guide means at the end of said second traveling conveyor arranged to engage said material strips on the conveyor and to dispose them for forwarding with their glued edges contiguous along one of the wider of said tables.

3. In combination, a conveyor having transverse work-guiding flights, edge-trimming saws operatively positioned at opposite sides of said conveyor, one in advance of the other, guides located above the flights and intermediate said trimmers, for shifting the work from one side to the other of said conveyor, glue spreaders operatively positioned at the sides of the conveyor beyond each saw, a guide arranged above the path of travel of the conveyor and positioned for removing the trimmed and glued pieces of work therefrom and positioning them preparatory to being forwarded by sliding flatwise with their glued edges crosswise of their path of travel, a material-strip press arranged to receive the pieces so positioned, said press including a table, a mechanically operated pusher at the receiving end thereof, yieldingly-pressed members opposite the table disposed to urge the pieces flatwise against the table, said presser members being distributed at spaced intervals lengthwise the table and gaged as to the pressure exerted by them, whereby to cause frictional resistance to the action of the pusher sufficient to produce against the edges of adjacent pieces when entering the table an intensity of pressure adequate to produce strong glue joints, the distribution of said presser members farther along the table being such as to maintain progressively diminishing pressure, at each joint, during its subsequent forward sliding movement.

4. In combination, a conveyor having transverse work-guiding flights, edge-trimming cutters operatively positioned at opposite sides of said conveyor, one in advance of the other, diagonally disposed guide bars located above the flights after said first trimmer, glue spreaders operatively positioned at the sides of the conveyor beyond each edge-trimming cutter, a guide operatively positioned for removing the trimmed and glued pieces of work from said conveyor and for positioning them preparatory to being forwarded by sliding flatwise with their glued edges crosswise of their path of travel, a material-strip press located to receive the pieces so positioned, said press including a stationary table, a mechanically operated pusher at the receiving end of the table, yieldingly pressed shoes opposite the table and disposed to urge the pieces flatwise against the table, said shoes being distributed at spaced intervals lengthwise the table and gaged as to the pressure exerted by them, said shoes adapted to cause frictional resistance to the action of the pusher sufficient to produce against the edges of adjacent work-pieces when entering the table an intensity of pressure adequate to produce strong glue joints.

5. A structure as set forth in claim 4, wherein the yieldingly pressed shoes which first engage the pieces of work that are being pushed along the table are provided with work-gripping teeth on their work-engaging faces.

6. In combination, a conveyor, edge-trimming cutters operatively positioned at opposite sides of said conveyor, one in advance of the other, work-shifting guides located above the flights and intermediate said cutters, a glue spreader operatively positioned at the side of the conveyor beyond one of said cutters, a guide operatively positioned for removing the trimmed pieces of work from said conveyor and for positioning them preparatory to being forwarded by sliding flatwise with their glued edges crosswise of their path of travel, a material-strip forming press arranged to receive pieces so positioned, said press including a table, a mechanically operated pusher, yieldingly pressed members positioned opposite the table and disposed so as to urge the pieces flatwise against the table, said yieldingly pressed members distributed at spaced intervals lengthwise the table, the distribution of said yieldingly pressed members being such as to maintain at each glued joint progressively diminishing pressure as the said joint approaches the delivery end of the table.

7. The combination with the machine frame and work-carrying bed, of a vertically movable frame positioned above the bed, a plurality of downwardly spring-pressed pads secured to the under side of said movable frame, parallel links pivotally connecting the machine frame with said movable frame, one of said links having an operating lever, a latch-bar pivoted to the end of said lever and releasably engaging a projection on the machine frame, said lever being spring-pressed to normally urge the lever in a direction to yieldingly depress the vertically movable frame and the spring-pressed pads carried by it.

8. In a machine for forming panel core stock from small work-pieces such as mill clippings, a conveyor including transverse work-supports thereon, a work-piece shifter associated with said supports and arranged to move work-pieces along said transverse supports during the forward movement of the conveyor, end trimmers and end glue spreaders operatively arranged alternately at the sides of the conveyor, means for pressing said work pieces end to end to form boards, means for trimming and glue-coating the edges of such boards, and means for pressing said edge-glued boards together edge-to-edge to form a panel band.

9. In a machine for forming panel core stock from small work-pieces such as mill clippings, means for trimming the ends of said work-pieces and means for spreading glue on said trimmed ends, a press adapted to unite said end-glued pieces into boards, trimmers and glue-spreaders arranged for trimming and for coating the edges of said boards with glue, and a press for forming panel bands, said press including an elongated table, means for supplying edge glued boards to a feeding-in end of said table in regular sequence, spring-pressed shoes yieldingly engaging the faces of said boards and urging them frictionally against the table, and a power-driven pusher bar adapted to slide boards forward along said table against the frictional resistance produced by said shoes and table.

10. In a machine for making core stock, a supporting table for work-pieces, reciprocatable forwarding means operative against the end of a row of work-pieces on said table to slidingly push said row lengthwise of the table, a driving motor for said forwarding means, a series of spring pressed pads mounted on a vertically movable horizontal frame spaced above the table, spring means adapted to cause said frame to normally press the pads down upon the work-pieces, a motor interrupter and means actuated by the frame adapted to stop the motor and the reciprocatable forwarding means when the frame is raised by the work piece, presser shoes spaced apart in a row located above and lengthwise of the table, each shoe being mounted for limited movement of its work-engaging face toward and from the table to accommodate work pieces of different thicknesses, means operatively associated with each shoe adapted to normally urge its working face into yielding frictional engagement with the faces of successive work-pieces of said row during their sliding movement lengthwise the table.

11. A structure as set forth in claim 10 wherein each shoe is pivotally secured at its upper part to a fixed support, its lower part being adapted to ride on the work-pieces, the yielding means associated with each shoe comprising a spring and releasable spring retaining device including a telescoping rod having a socket at its upper end and a pin on the stationary frame adapted to be releasably engaged by said socket, whereby individual shoes may be rendered inoperative and the intensity of endwise pressure on the work pieces is controlled during their travel along the table.

12. A press for the continuous production of a band consisting of edge-glued pieces of wood, comprising a fixed table, a mechanical pusher adapted to slidingly push pieces of wood upon the table in regular order lengthwise with their glued edges disposed crosswise of their direction of travel, a fixed frame above the table, a plurality of individually spring-pressed shoes spaced apart on said frame in a row located above and lengthwise of the table, said shoes adapted to yieldingly press the said pieces downwardly against the table so as to set up between the shoes and table a frictional resistance to the forward urging of the pusher sufficient to cause the glued edges of adjacent pieces to be pressed together tightly enough for the production of effectively glued joints, and means for quickly varying the amount of end pressure on the glued joints, comprising a pin on the stationary frame, a telescoping rod connecting a spring-pressed shoe with the pin, said rod having a socket for releasably engaging the pin, a handle on the telescoping rod, for the purposes set forth.

13. In a machine for making core stock, a stationary table, a work-piece pusher bar associated therewith, means for actuating said pusher bar including a reciprocatable carriage, upon the rear end of which said bar is mounted, a counterbalance weight pivotally carried by the carriage for balancing the weight of the pusher bar, and power-driven mechanism connected to the carriage for reciprocating the same.

14. In combination a work-piece table, a stationary beam located above the table and spaced therefrom, a plurality of shoes spaced apart lengthwise the beam and pivotally secured thereto at their upper parts, their lower ends constituting work-engaging faces, a spring for each shoe, normally urging its work-engaging face toward the table, and means releasably securing said spring at its upper end to the beam, comprising a telescoping rod having a socket at its upper end, a pin on the stationary frame adapted to be releasably received in the socket, for the purposes set forth.

15. A fixed table for supporting work-pieces, means for pushing the work-pieces along the table intermittently, yieldable shoes normally urging the work pieces against the table and a spacer-feeding device associated with said work piece feeding means and operative in timed-in relation thereto, said device including a spacer container, spacer releasing means therefor, and guides arranged to direct the released spacer one at a time from the container onto the table between certain of the work-pieces.

16. In a machine for forming panel core stock from small work pieces such as mill clippings, a conveyor including transverse work-supports thereon, means for shifting said work-pieces transversely of the direction of travel of said conveyor during the forward movement thereof, trimmers and glue spreaders operatively arranged alternately at the sides of the conveyor, means for pressing said work-pieces end to end to form boards, means for trimming and glue-coating the edges of said boards, and means for pressing said edge-glued boards together edge-to-edge to form a panel band.

17. A material-strip press including a stationary table, a mechanically operated pusher at the receiving end of the table, a plurality of rows of yieldingly pressed shoes positioned opposite the table and disposed to urge the pieces flatwise against the table, the shoes of each row being distributed at spaced intervals lengthwise the table and gaged as to the pressure exerted by them, said shoes adapted to cause frictional resistance to the action of the pusher sufficient to produce against the edges of adjacent work-pieces when entering the table an intensity of pressure adequate to produce strong glue joints, said rows of shoes arranged in two parallel groups, one group comprising a ribbon forming press, the other comprising a panel forming press, both of said presses served by the said pusher for simultaneous production of ribbon stock and panel stock.

18. In combination a horizontal stationary bed, a work piece push-feed mechanism and a motor for driving the same operatively associated, a fixed beam spaced above said bed, shoes pivotally secured to said beam and in spaced relation lengthwise thereof, each shoe having its bottom working face positioned below and rearwardly of its pivotal point, yieldable means operative on each shoe normally urging its working face downwardly, a liftable frame positioned above said bed and supported for up-and-down movement relative thereto, at the feeding-in end thereof, downwardly spring-pressed pads on said frame opposite the bed and means for raising and lowering said frame and the pads secured thereto, an electrical make-and-break switch operatively connected to said liftable frame, said switch being in circuit with the motor connected for operating said work-piece push feed mechanism whereby the motor is rendered inoperative when the pads are raised from the work.

19. In combination a horizontal stationary bed, a work piece push-feed mechanism and a motor for driving the same operatively associated, a fixed beam spaced above said bed, shoes pivotally secured to said beam and in spaced relation lengthwise thereof, each shoe having its bottom working face positioned below and rearwardly of its pivotal point, yieldable means operative on each shoe normally urging its working face downwardly, a liftable frame positioned above said bed and supported for up-and-down movement relatively thereto, at the feeding-in end thereof, downwardly spring-pressed pads on said frame opposite the bed and means for raising and lowering said frame and the pads secured thereto, parallel pivoted links secured at their upper ends to fixed supports and at their lower ends to the liftable frame, actuating levers secured to certain of said links for actuating them to raise and lower the liftable frame, a latch engageable with each lever to hold the frame in its normally raised position, and a spring co-operating with said latch and said lever for automatically lowering the frame when the latch is released.

In testimony whereof, I affix my signature.

JOHN L. HERZOG.